(12) United States Patent
Ruiz Rodriguez et al.

(10) Patent No.: US 6,528,206 B2
(45) Date of Patent: Mar. 4, 2003

(54) ELECTRIC ACCUMULATOR BATTERY

(75) Inventors: Rafael Ruiz Rodriguez, Guadalajara (ES); Antonio Ripoll Anton, Madrid (ES)

(73) Assignee: Sociedad Española del Acumulador Tudor, S.A. (ES)

( * ) Notice: Subject to any disclaimer, the term of this patent is extended or adjusted under 35 U.S.C. 154(b) by 35 days.

(21) Appl. No.: 09/768,095

(22) Filed: Jan. 22, 2001

(65) Prior Publication Data

US 2002/0098412 A1 Jul. 25, 2002

(51) Int. Cl.⁷ .................. H01M 10/06; H01M 10/50
(52) U.S. Cl. ............... 429/204; 429/94; 429/99; 429/120; 429/136; 429/300; 429/159
(58) Field of Search ................... 429/136, 204, 429/159, 120, 94, 99, 175, 176, 300

(56) References Cited

U.S. PATENT DOCUMENTS 5,607,797 A * 3/1997 Hasegawa et al. .......... 429/208
6,007,937 A * 12/1999 Ruiz Rodriguez et al. .... 429/94
6,153,335 A * 11/2000 Vutetakis et al. ....... 429/136 X
6,274,263 B1 * 8/2001 Jones ..................... 429/204 X

FOREIGN PATENT DOCUMENTS

| EP | 1035599 A1 | 9/2000 |
|---|---|---|
| JP | 133217 | 5/2000 |

* cited by examiner

Primary Examiner—John S. Maples
(74) Attorney, Agent, or Firm—Ostrolenk, Faber, Gerb & Soffen, LLP

(57) ABSTRACT

Electric accumulator battery, which comprises a receptacle (1) with cover, of a size which fits in the compartment traditionally reserved for this purpose in a motor vehicle. This receptacle is subdivided internally into a series of cells (2) that are distributed in two or more parallel rows between which are formed intermediate ventilation ducts (3), which are open to the outside through the bottom and the cover.

12 Claims, 9 Drawing Sheets

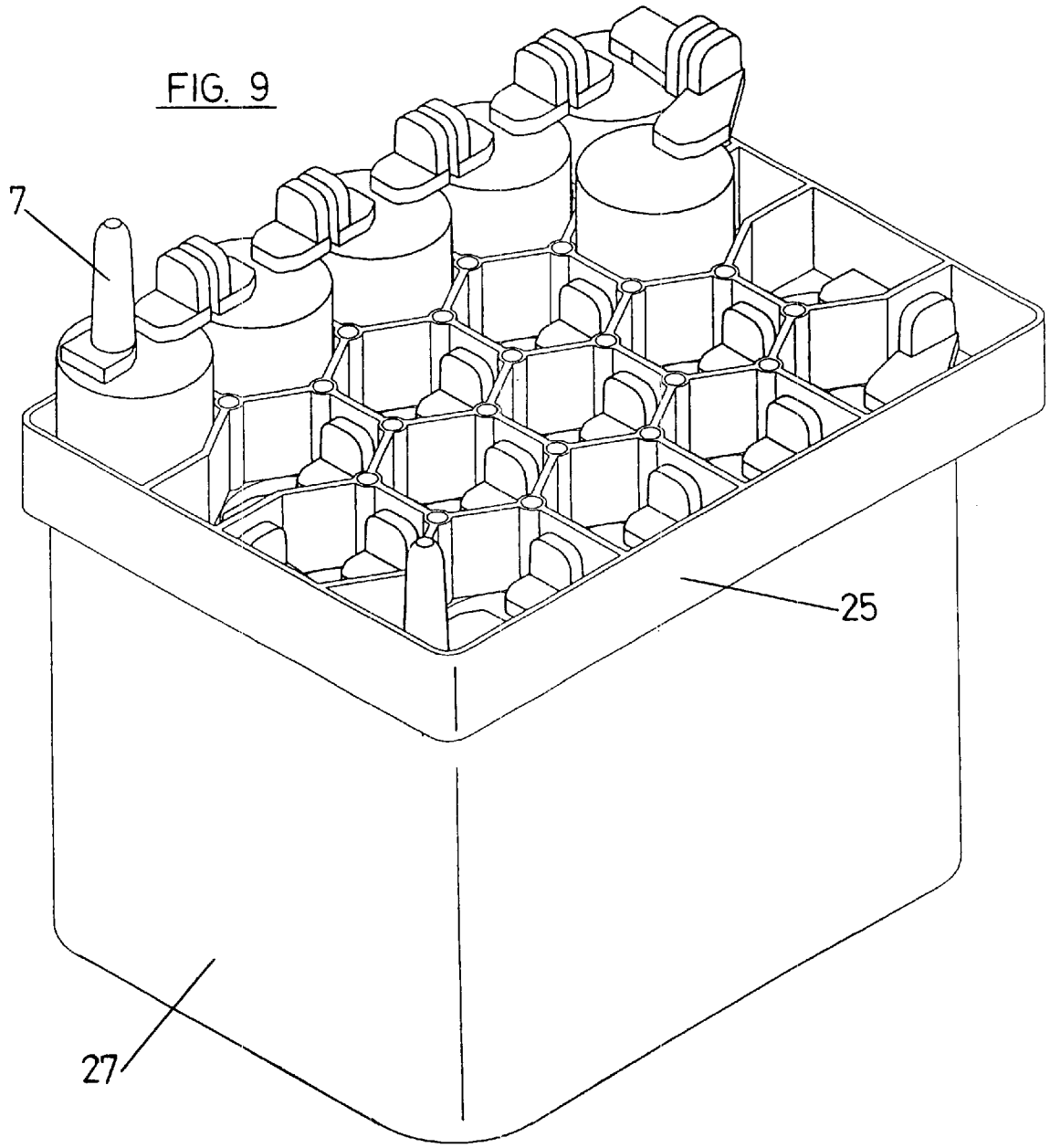

ELECTRIC ACCUMULATOR BATTERY

The present invention relates to an electric accumulator battery, of the lead-acid type, employed, for example, in the starting, lighting and semi-traction of motor vehicles.

More specifically, the battery of the invention refers to a battery of the conventional type or of the recombination type, which comprises a receptacle generally prismatic in form, closed at the top by means of a cover through which project the connection terminals, the receptacle being internally subdivided into cells, preferably more than six cells, in which are housed insulated positive and negative electrodes with intermediate separators.

The present evolution of motor vehicles towards increasingly sophisticated internal and external fittings and the need to economise in the investment required to produce such motor vehicles, is producing an increasing demand for electric power on board the vehicle, which signifies recurring more and more frequently to the battery and an ever-growing demand for power which in turn needs a cable of greater cross section and which also discharges the battery much more deeply, leading to a considerable reduction in battery life.

The conventional design of the batteries employed as power source in motor vehicles is presently standardised in the coupling of six series-connected elements, each one of which has a determined number of positive and negative electrodes connected in parallel and physically separated by a porous material, which permits the free circulation of the ions that intervene in the electrochemical reactions of charging and discharging.

Due to the growing demands of the automobile manufacturers with regard to increasing power, while respecting or even reducing the outside dimensions, the battery manufacturers find themselves obliged to increase the number of electrodes per element, by reducing their thickness, since the standard rated voltage is 12 Volts and the total dimensions must also be respected. The reduction in electrode thickness leads to a reduction in service life, due generally to the destructive effect of the corrosion of the grids that act as holders of the active material of the electrodes and as conductors of the electric current produced. As a consequence thereof, the 12 Volt batteries designed to supply high power levels have a very limited duration in cycle life and give rise to premature failures under the most extreme conditions demanded by modern vehicles.

The objective of the present invention is a battery which permits maintaining of suitable dimensions within the internal architecture of the vehicle in which it is to be equipped and provision of the high power required, greater than the 12 Volts which have been standardised up to now.

Some motor vehicle manufacturers are calling for studies to achieve the use of batteries with a nominal voltage of more than the 12 Volts rated and standardised up to now, with the condition that either the standardised outside measurements be maintained or the dimensions be suitable for the compartment available in the vehicle for holding the battery; more specifically, the motor vehicle manufacturers wish to have batteries rated at 36 Volts, for the principal objective of assuring the starting operation, since the current necessary to start the vehicle would be around one third of that presently required, and with the additional objective of economising on the cost of the main cabling, whose cross section would be reduced in line with the rise in voltage.

The design of a 36 Volt battery can be made, according to the present invention, by means of joining in series 18 elements having electrodes that can be flat or of another type, like for example, spiral in form, in which the increase in electrode surface area is limited by the internal geometry of each element and by the thickness of the plates and separators.

Manufacture of 12 Volt batteries is standard practice and consequently it would only be necessary to connect three batteries in series to achieve a 36 Volt battery. The present invention refers to a battery of more than 12 Volts, generally 36 Volts in a single receptacle, which is also adapted to fit in the compartment allowed by the manufacturers of modern motor vehicles.

On the other hand, the manufacture of a battery of more than 12 Volts in a reduced space means the elements have to be mounted up against each other, resulting in thermal differences because of the difficulty of achieving uniform cooling; it is well known that the high temperature caused by the vehicle engine has a strong influence on battery lifetime due, among other reasons, to the greater concentration of electrolyte produced by the greater evaporation of water because of the increased temperature, due also to the higher charging current occurring when the vehicle is running, which in turn is the cause of an overcharging effect whereby a greater quantity of the water held in the electrolyte is decomposed, which in turn leads to premature deterioration of the battery; thus the elements that are least exposed to the cooling effect deteriorate before those receiving better cooling and cause the premature destruction of the unit, even though there are other elements which remain unharmed.

The purpose of the present invention is to achieve a battery which, having a rated voltage greater than 12 Volts, generally 36 Volts, is housed either in a standard normalised size for use in motor vehicles, or else has a size adequate for the space requirements in the motor vehicle interior, with the condition that it be capable of maintaining cooled the front cells or elements to prevent the thermal differences that result in premature battery failure.

To this end, in accordance with the invention, the battery receptacle is internally subdivided into six cells and preferably into ten and eight cells, which shall be distributed in two parallel rows between which the receptacle forms one or more intermediate voids, which penetrate through the base and cover and constitute ventilation ducts.

Moreover, the cover of the receptacle, on two of its opposite edges, below the upper surface of said cover, forms cavities which are of a size that permit the fingers to be inserted and serve as grips that facilitate battery handling and transportation.

The aforementioned characteristics and advantages can be more easily understood through the following description, made with reference to the attached drawings, in which an embodiment is shown in a non-restrictive manner.

BRIEF DESCRIPTION OF THE DRAWINGS

FIG. 9 shows, in perspective, a further example of embodiment.

Figure 1:
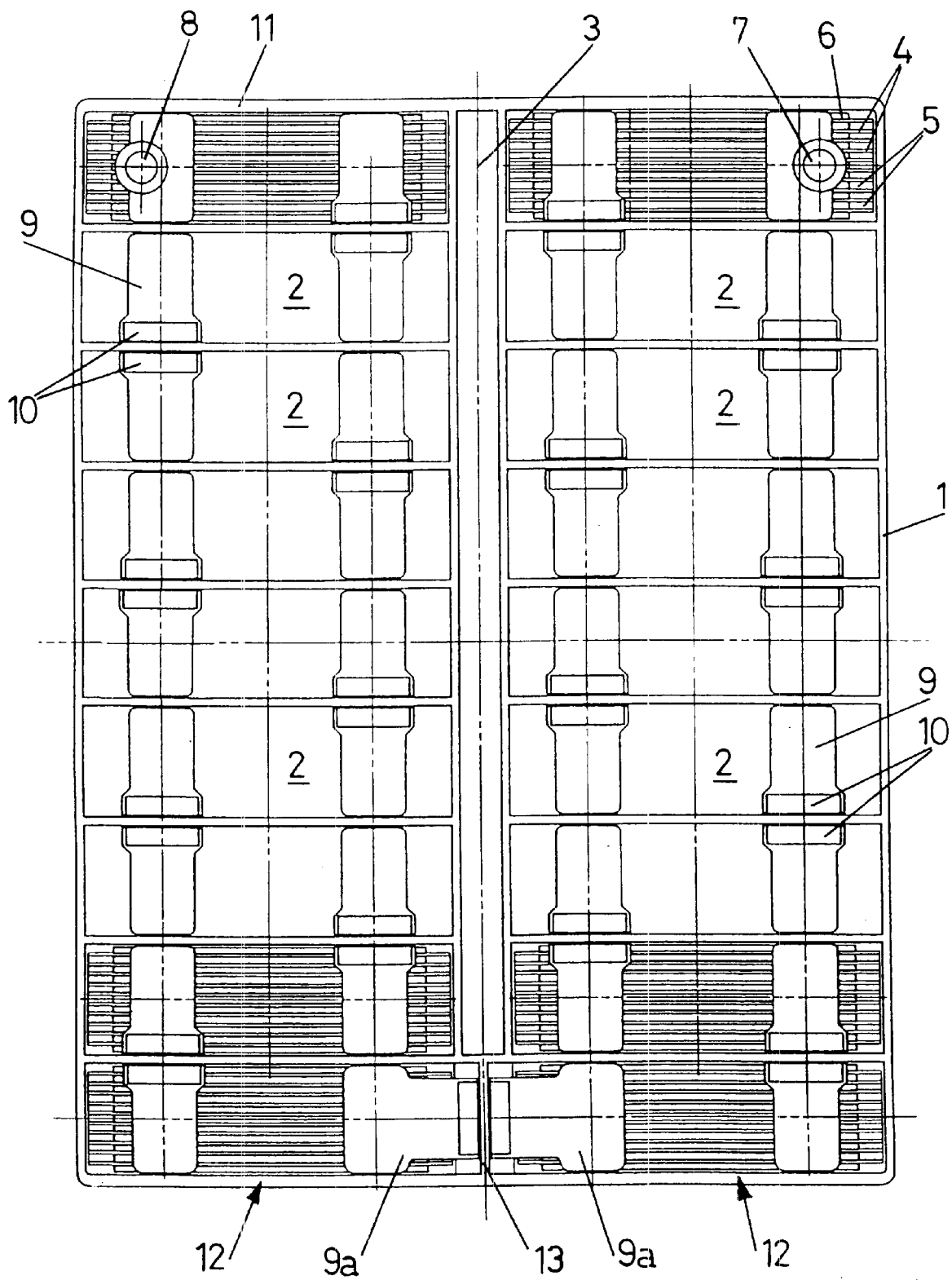
FIG. 1 is a plan view of a battery with flat electrodes, constituted in accordance with the invention, without the top cover in order to show the layout of the cells.

The battery shown in FIG. 1 includes a receptacle 1 of rectangular prismatic shape, which is internally subdivided into a total of 18 cells, which are referred to with the number 2, said cells being distributed in two longitudinal rows. These two rows are separated by an intermediate longitudinal void 3 which emerges through the bottom of the receptacle and also through the cover, as can be appreciated from FIG. 3, defining a ventilation duct, by means of which an enhanced cooling is achieved of the different cells.

Within each of the cells 2 positive and negative plates are housed, referred to with numbers 4 and 5, between which are arranged separators 6. In order to make best use of the space of the cells 2, the separators 6 are mounted in bag form, within which is always placed the plate of one polarity. The references 7 and 8 indicate the terminals of the battery.

The plates of like polarity are joined in each cell by the straps 9. In turn, the straps of different polarity pertaining to consecutive cells are electrically connected by means of straps 10.

As can be appreciated from FIG. 1, the duct 3 runs between one of the transversal walls 11 of the receptacle and the outermost cell 12 of the two rows of cells, which are separated by means of an intervening partition 13 through which the electrical connection is made by means of straps 9a.

Figure 2:
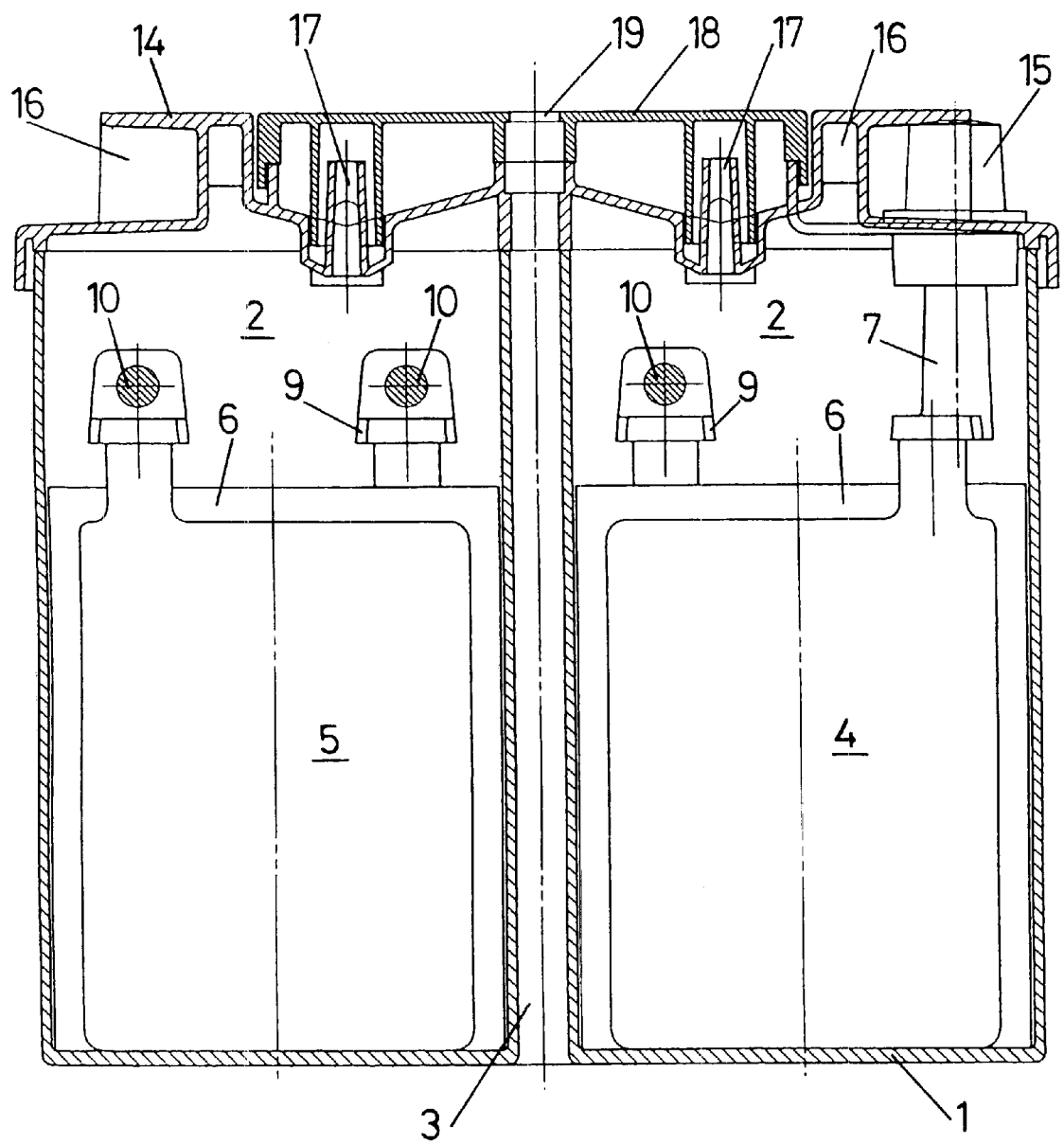
FIG. 2 is a vertical transversal section of the battery of FIG. 1.

In FIG. 2 can be seen the electrodes 4 and 5 and the separator 6, the position of terminal 7, plate linking straps 9 and interconnecting straps 10 between consecutive cells. Between the two rows of cells 2 is to be found the space 3 which emerges through the bottom of the receptacle and through the cover 14. Terminals 7 and 8 finalise in external power points 15.

The cover 14 has, starting from two of its opposite sides and below the top surface, cavities 16 of a size allowing the fingers to be inserted and serving as a grip, without said cavities having a negative effect, due to their position, on other characteristics of the battery, such as its stackability, an important property for battery storage.

The cover 14 has a central depression in which are to located the orifices 17 for gases to escape from the cells, with labyrinth permitting the filling with electrolyte and the escape of gases from the cells. The labyrinth arrangement prevents the liquid from spilling out, even when the battery is excessively inclined, at the same time as it prevents the possible escape of drops of liquid that might be carried in the gases produced by the battery. The depression of the cover 14 is closed by means of a lid 18.

The lid 18 has a longitudinal groove 19 facing the intermediate void 3, to permit the circulation of cooling air and which, if necessary, can be forced, for example by air supplied by a fan or similar.

Figure 3:
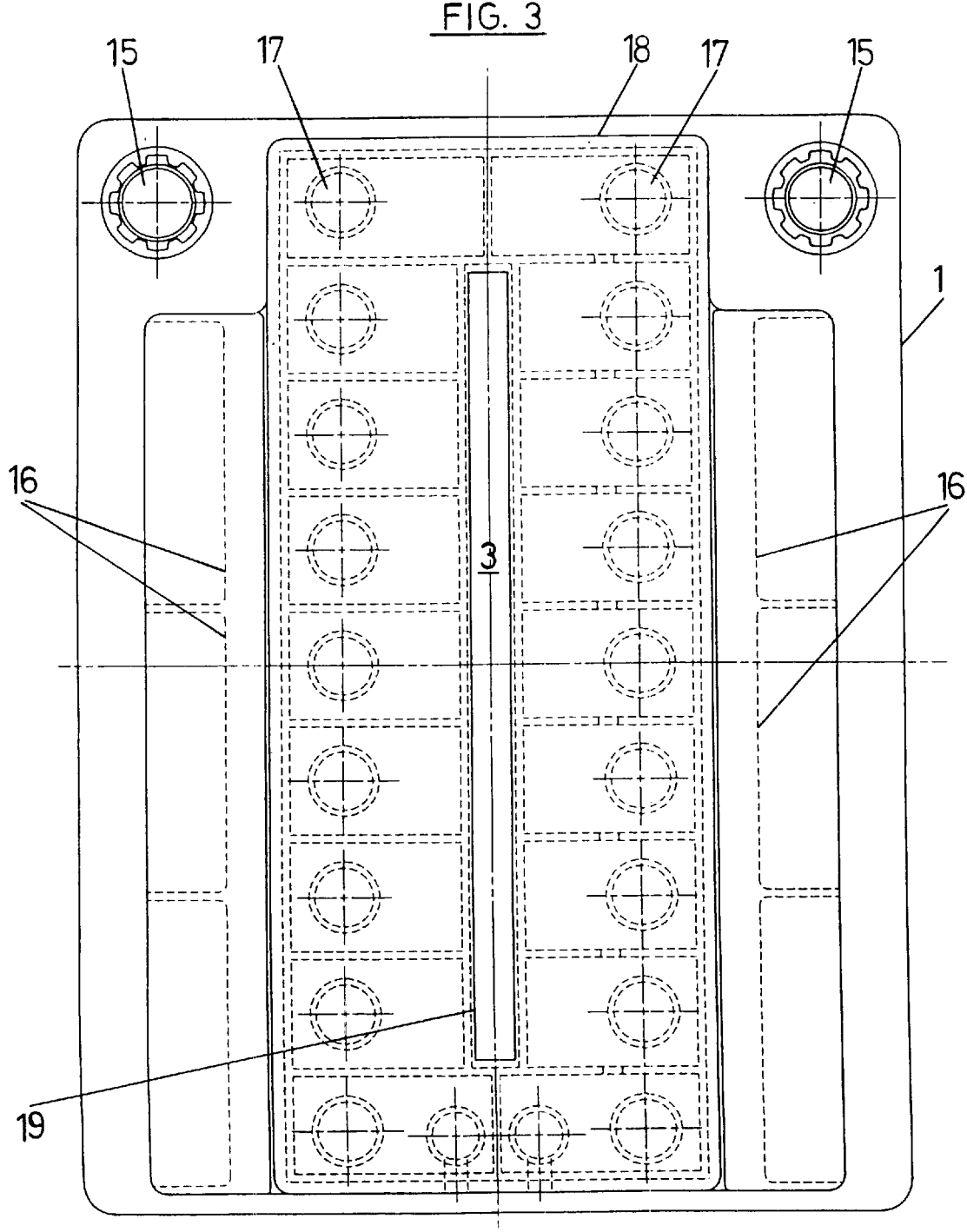
FIG. 3 is a plan view of the battery of FIG. 1 with the cover.
Figure 4:
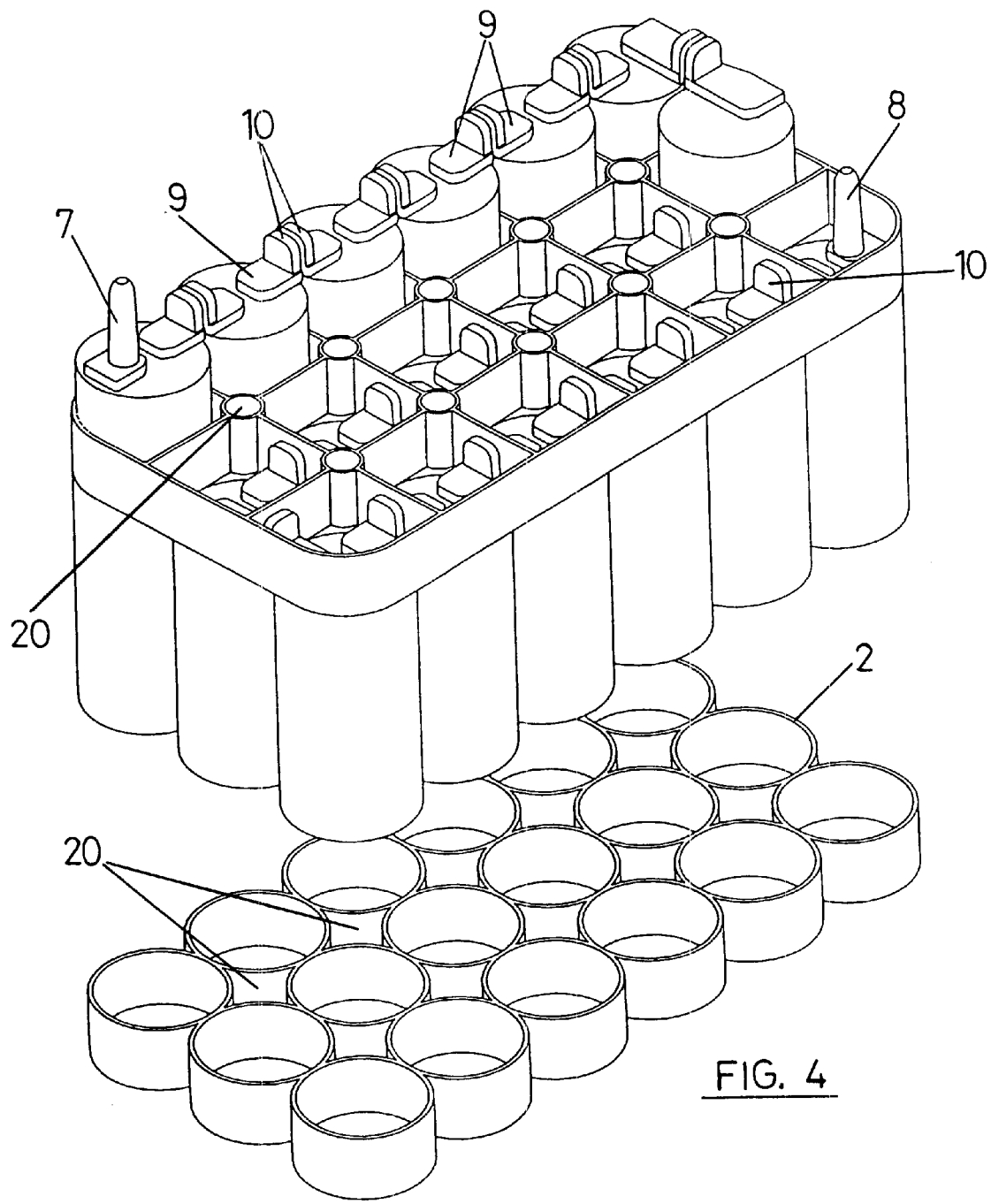
FIG. 4 is a view in perspective of the electrolytic recombination, with spiral electrodes, which incorporates the characteristics of the invention.
Figure 5:
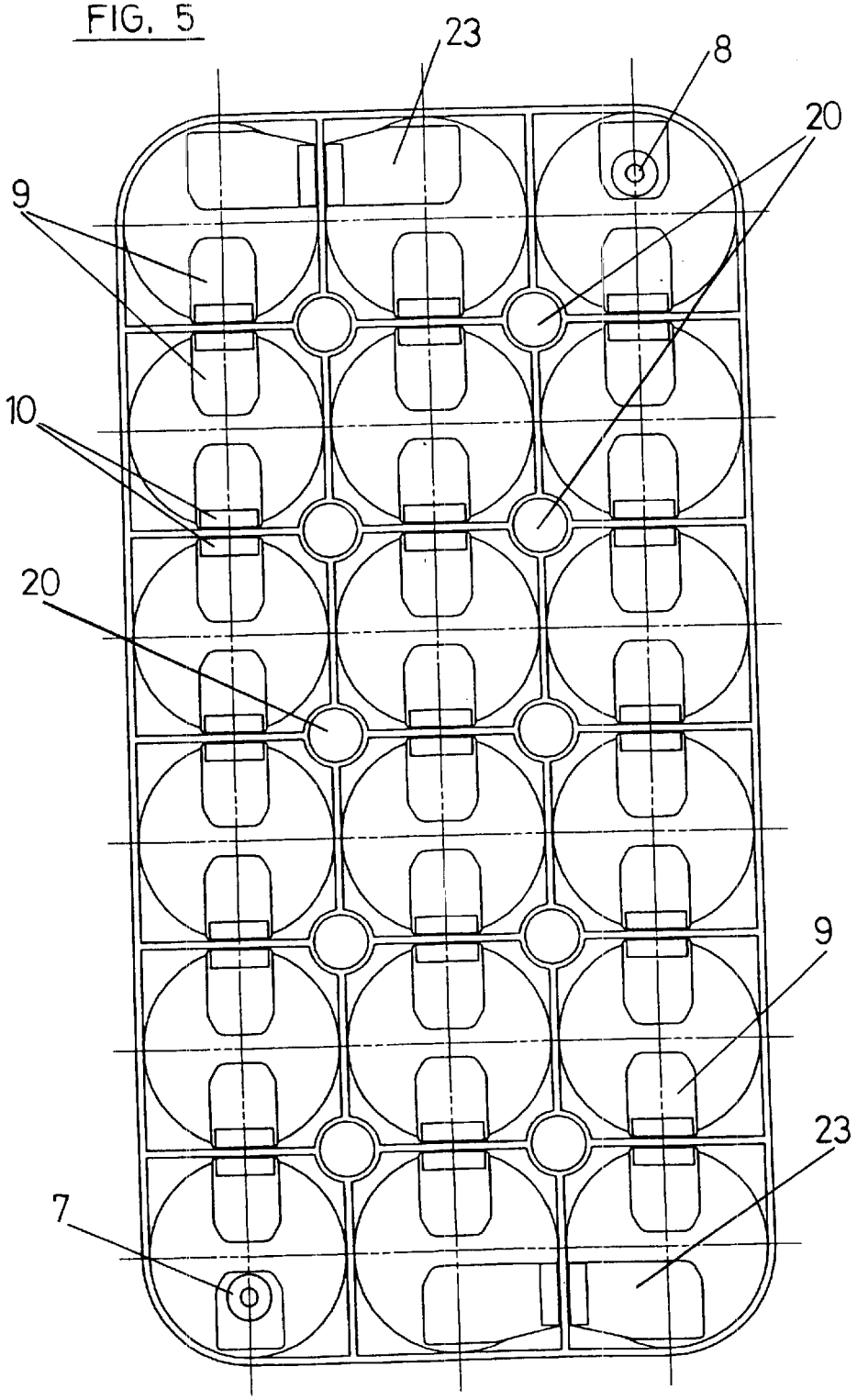
FIG. 5 is a plan view of the battery of FIG. 4.

FIGS. 4 and 5 show a perspective, plan view of an electrolyte recombination battery, with spiral electrodes and of prismatic construction. Terminals 7 and 8 are positioned in opposite corners. FIG. 4 includes a section of the lower part of the battery receptacle, in order to appreciate the cells 2 and the vacant spaces 20, delimited by these cells, which serve as cooling ducts for achieving temperature uniformity, in accordance with the present invention, and which have identical function to that of void 3 of the battery shown in FIGS. 1 to 3.

As in the case of FIGS. 1 and 3, the plates of the different cells are connected by means of straps 9. The straps of different polarity pertaining to consecutive cells are connected to each other by straps 10. Number 23 indicates one of the welded plate connectors, different to straps 10 for design requirements.

Figure 6:
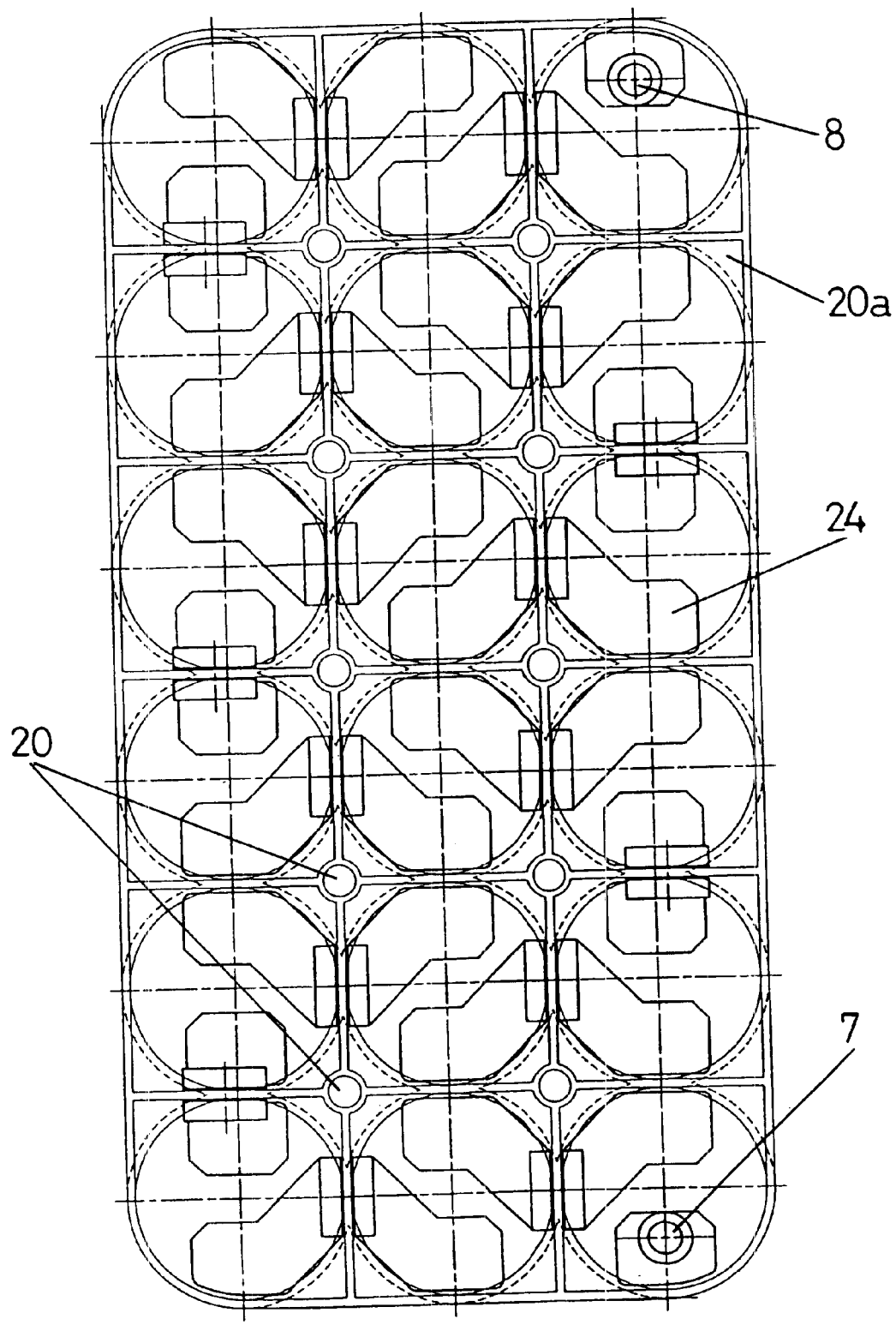
FIG. 6 is a view similar to that of FIG. 5, showing a variation in implementation.

In FIG. 6 a plan view is shown of a battery with spiral electrodes, in which terminals 7 and 8 can be seen, located on the same side of the battery cover in order to meet the requirements of determined motor vehicle manufacturers. To achieve this arrangement an S-shaped connector has been designed, here referred to with number 24. In this embodiment, just as with all those which offer the characteristics of the present invention, cooling orifices 20 are provided.

Figure 7:
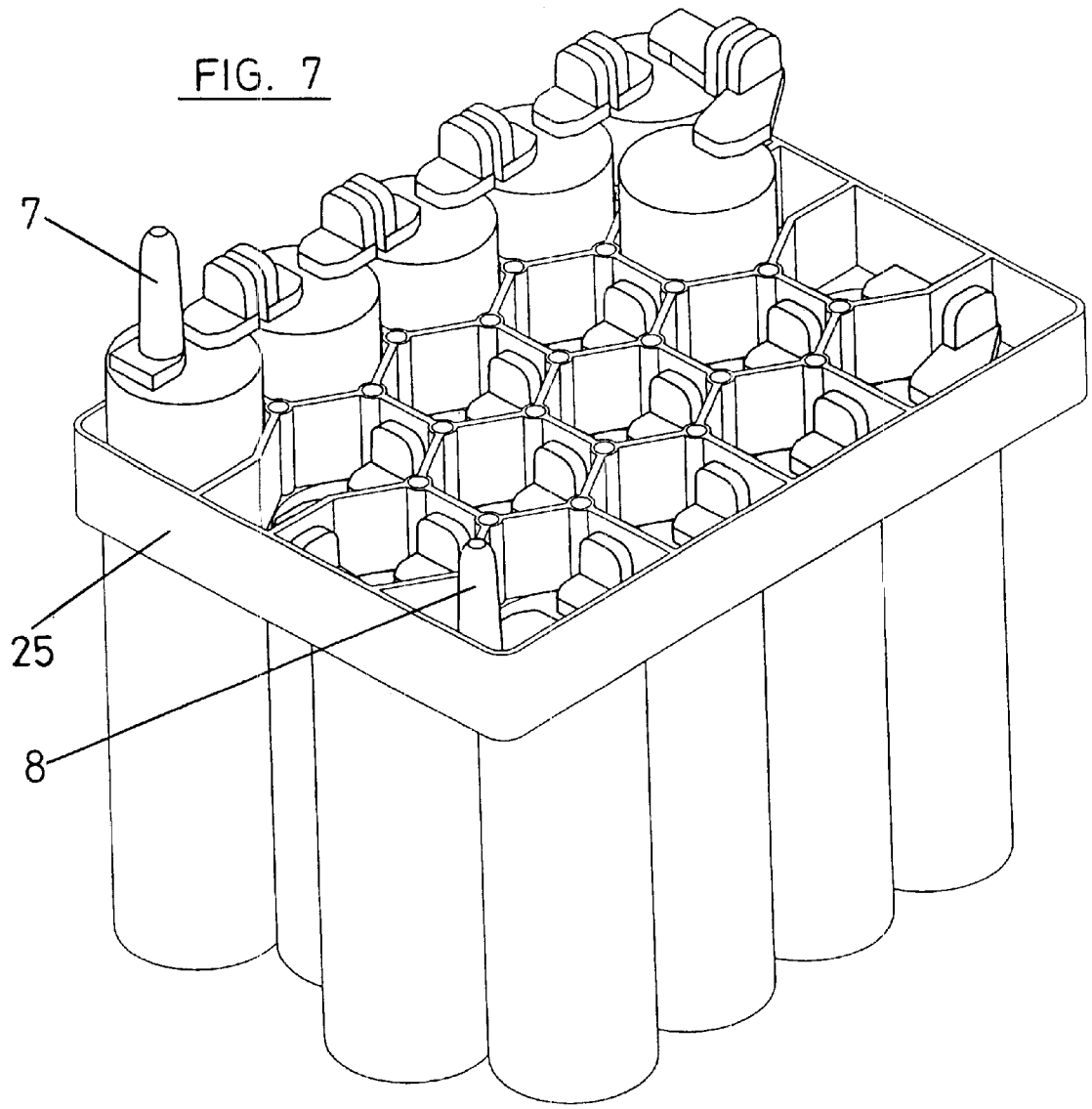
FIG. 7 shows, in perspective, another form of embodiment.

In FIG. 7 is shown another battery design with spiral electrodes and with terminals 7 and 8 for the power points located on one of the shorter sides of the battery. This construction would permit cooling of the peripheral surface of all the elements or cells. In addition there is the peripheral broadening 25, which projects sufficiently to allow the insertion of fingers or robotic handling instruments.

Figure 8:
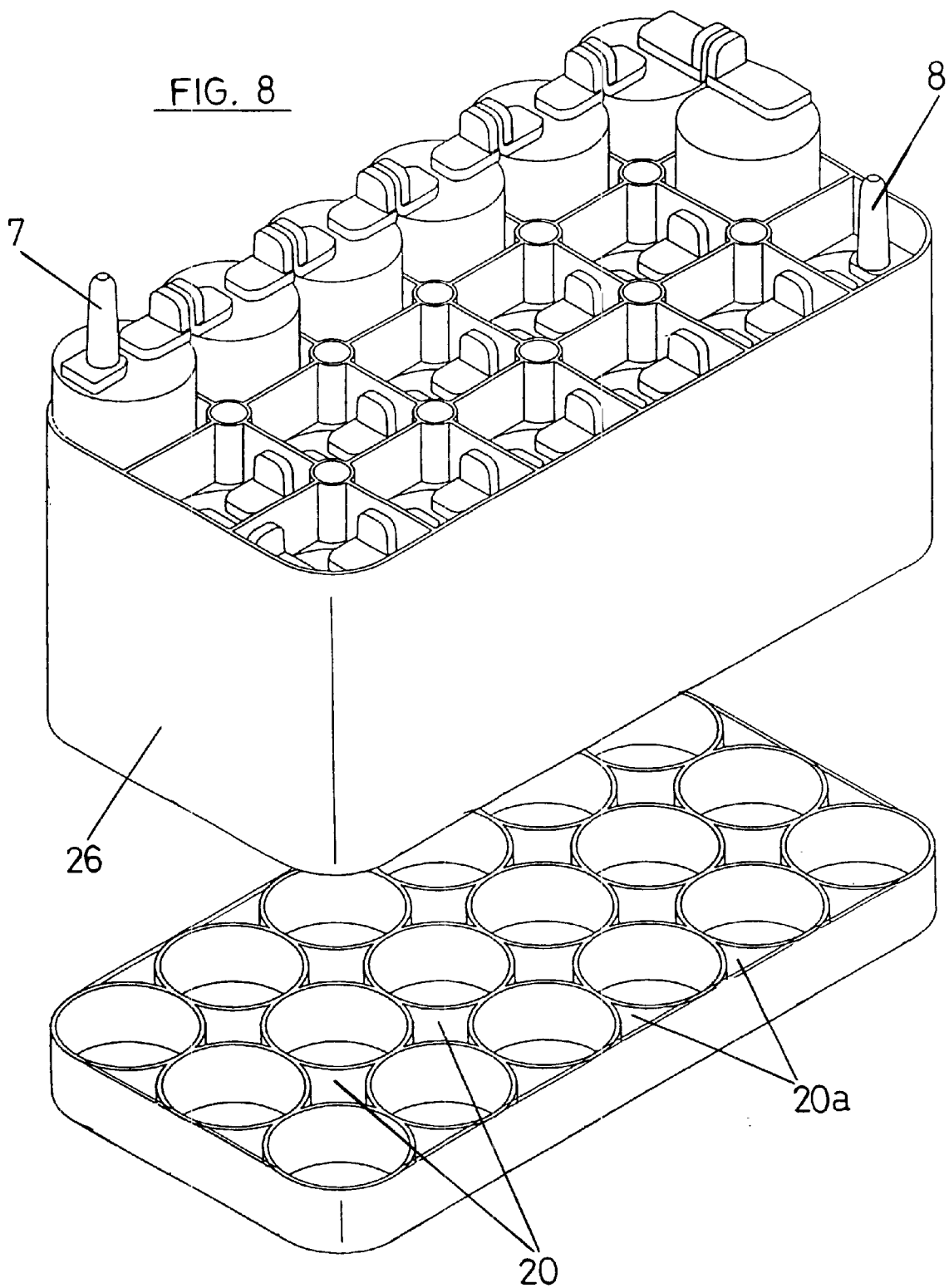
FIG. 8 is a view similar to that of FIG. 4, showing a variation in implementation.

The assembly shown in FIG. 8, which is a variant of the battery of FIG. 4, includes a side wall 26 which permits the cooling of each of the elements or cells, not only via the intermediate ducts 20 but also via the channels 20a delimited between every two consecutive outermost cells or elements.

Finally FIG. 9 shows the assembly of FIG. 7 inside the wall or receptacle 27.

What is claimed is:

1. Electric accumulator lead-acid battery, which comprises a receptacle with a cover, of a general rectangular prismatic shape, of dimensions that adapt to an engine compartment in a motor vehicle, characterised in that said receptacle is internally subdivided into more than 6 cells, which are distributed into two or more parallel rows between which the said receptacle forms intermediate ventilation voids which penetrate to the outside through the bottom and cover and constitute ventilation ducts.

2. Battery according to claim 1, characterised in that the intervening cells are distributed in two rows between which is situated a ventilation void, which runs between a transversal wall of the receptacle and the last cell of the two rows, said rows being separated by an intermediate partition through which passes an electrical connection strap between plates.

3. Battery according to claim 1, characterised in that the cover of the receptacle forms on two of its opposite sides and underneath a top surface, cavities of a size which permits the fingers to be inserted.

4. Battery according to claim 1, characterised in that the ventilation voids are situated between every four central adjacent cells, permitting uniformity in the temperature of said cells.

5. Battery according to claim 4, characterised in that ventilation voids are delimited between every two consecutive outermost cells.

6. Battery according to any one of claims 1, 2 and 3, characterised in that positive and negative plates that constitute electrodes, are of a flat spongy type, in which all plates of a common polarity are contained in a separator to physically isolate them from plates of opposite polarity.

7. Battery according to any one of claims 1, 2, and 3, characterised in that a separator that isolates plates of one polarity from plates of an opposite polarity, is of a glass micro-fibre type and the cover has at least one gas-pressure safety valve, constituting a recombination type battery with electrolyte fixed in the glass micro-fibre separator.

8. Battery according to any one of claims 1, 2, and 3, characterised in that the cover comes with at least one gas-pressure safety valve and an electrolyte is fixed inside each cell by formation of a gel, thereby constituting a recombination type battery with fixed solid electrolyte.

9. Battery according to any one of claims 1, 3, 4, and 5, characterised in that positive and negative plates that constitute electrodes of each cell are wound to form a spiral and are separated by a glass micro-fibre envelope, thereby constituting a recombination type battery with electrolyte fixed in a glass micro-fibre separator, whose cover has at least one gas-pressure safety valve.

10. Battery according to claim 6, characterized in that a separator that isolates plates of one polarity from plates of an opposite polarity, is of the glass micro-fibre type and the cover has at least one gas-pressure safety valve, constituting a recombination type battery with electrolyte fixed in the glass micro-fibre separator.

11. Battery according to claim 6, characterized in that the cover has at least one gas-pressure safety valve and an electrolyte is fixed inside each cell by the formation of a gel, thereby constituting a recombination type battery with fixed solid electrolyte.

12. A battery according to claim 1 wherein said receptacle is internally subdivided into 18 cells.

* * * * *